Patented July 21, 1953

2,646,386

UNITED STATES PATENT OFFICE 2,646,386

PROCESS OF PREPARING VITAMIN B$_{12}$-ACTIVE PRODUCT FROM SEWAGE SLUDGE

Carl Shelley Miner, Jr., Winnetka, and Bernard Wolnak, Chicago, Ill., assignors to Sewerage Commission of the City of Milwaukee, Milwaukee, Wis., a corporation of Wisconsin No Drawing. Application March 3, 1951, Serial No. 213,794

5 Claims. (Cl. 167—81)

This invention relates to a product having high vitamin B$_{12}$ activity and to a process of preparing the product and has for an object the provision of a product particularly suitable for incorporation into animal feeds. This application is a continuation-in-part of our prior application Serial No. 132,404, filed December 10, 1949.

At the present time there is a large commercial market for prepared feeds for poultry and other nonruminant animals such as hogs. Such feeds as now commercially sold comprise essentially proteins and carbohydrates of vegetable origin, such as are contained in meals obtained from wheat, corn, rice, oats, barley, linseed, soybeans and cotton seed, etc. Usually a prepared feed contains a combination of meals of this character in varying proportions. In order to provide a satisfactory feed it has also been the practice to incorporate various vitamins and mineral constituents. Also it has long been believed that the vegetable proteins contained in meals of this type must be supplemented at least to some extent with animal proteins, such as fish meal or meat scraps, in order that the animal fed may efficiently utilize all of the vegetable proteins contained within the feed. Generally speaking, such animal proteins have been incorporated into feeds of this character in various amounts between about 2 per cent and about 5 per cent in order that the desired response may be obtained in the animals raised on the feed. However, fish meal, meat scraps and other animal proteins represent a substantial item of cost in the preparation of feeds of this general character and are available only in limited amounts. Accordingly, various attempts have been made in the past to cut down on the amount of, and to find cheap substitutes for, the animal proteins necessary to be added to feeds without adversely affecting the desired response of the animal fed. It is now known that this result can be achieved by mixing with the feed a growth factor which contains a high vitamin B$_{12}$ activity. Vitamin B$_{12}$ has come to be recognized as the growth factor or animal protein factor (APF) which is supplied to feeds by the addition of meat scraps, fish meal and the like.

Accordingly it is one object of this invention to provide a product having a high vitamin B$_{12}$ activity which is suitable for use in animal feeds and for other purposes.

A further object of this invention is the provision of a vitamin B$_{12}$ active material obtainable from a readily available source.

A still further object of this invention is the provision of a product that may be substituted wholly or in part for animal proteins normally considered desirable in feeds for poultry and other nonruminant animals.

An additional object of this invention is the provision of a process of preparing a concentrate suitable for use in the preparation of feeds.

An additional object of this invention is the provision of a process for preparing a product having a high vitamin B$_{12}$ potency from a readily available source material.

Further and additional objects will appear from the following description and the accompanying claims.

In accordance with one embodiment of this invention a product having a high vitamin B$_{12}$ activity is one which comprises a water-soluble fraction of a sludge resulting from the microbiological treatment of sewage. This water-soluble fraction may be obtained by leaching a dried sludge of this character with a suitable solvent such as water to extract the vitamin B$_{12}$ active material, separating the undissolved residue and then further concentrating the resulting solution by evaporation to form a residue or concentrate that has an extremely high vitamin B$_{12}$ potency.

In accordance with a preferred embodiment of this invention, the sludge employed for preparing the concentrate is of the type known as activated sludge. Dried activated sludge is now available commercially and sold under the trade name "Milorganite." It is the product obtained from that type of municipal sewage treatment and purification known in the art as the "activated sludge process." The commercial procedure for obtaining a dried form of activated sludge is somewhat as follows: Raw sewage, sanitary and industrial, is brought to a sewage-treating plant by an extensive system of municipal sewers. The incoming raw sewage is passed through partial sedimentation tanks and screens to remove large particles of suspended mineral and organic matter. The screened sewage is then mixed with, for example, about 25 per cent by volume of undried, freshly produced activated sludge which latter serves as an inoculant. The resulting mixture, termed "mixed liquor," is then passed through large aeration tanks where it is agitated and aerated for four to six hours by a continuous stream of tiny air bubbles. The air bubbles are formed in the mixed liquor by passing washed and compressed air through porous plates in the bottom of the aeration tanks. During aeration the finely divided organic matter in the mixed liquor coagulates into large flocs which comprise essentially the bodies of bacteria, molds, yeasts and protozoa. The aerated mixed liquor is then passed into large settling tanks where the flocculated matter settles to the bottom as activated sludge. The supernatant liquid comprising water and harmless soluble substances, such as nitrates and sulfates, is discharged from the treating plant. A portion of this settled activated sludge (containing about 2% by weight of solids) is used to inoculate fresh incoming screened sewage as above described and the remaining sludge is treated with ferric chloride and filtered. The ferric chloride serves to speed the filtering operation. The filter cake containing from about 80% to about 85% moisture is dried to about 5% moisture with artificial heat in large revolving driers. The resulting granular substance is screened to uniform particle size, bagged and sold under the trade name "Milorganite." To date the chief use of this product has been as a fertilizer.

While in the foregoing a more or less specific method has been indicated for the preparation of activated sludge, it will, of course, be apparent that the process may be deviated from whereby to produce a sludge suitable for treatment as contemplated by this present invention. For example, reagents other than ferric chloride, such as sulfuric acid, aluminum sulfate, aluminum chloride, and the like, may be used as coagulants to speed the final filtering operation. If desired, such coagulants may be omitted entirely. By the term "activated sludge" as used in this specification and in the appended claims is meant any substance which comprises essentially a mass of microorganisms that is formed by the aeration of inoculated sewage under conditions favoring microbial growth.

In accordance with this invention, the heat-dried activated sludge may be extracted with water or other suitable solvent in which the vitamin $B_{12}$ active material is soluble and thereafter the undissolved solids are separated from the resulting extract. The extract is then concentrated, as by evaporation, to remove at least a portion of the solvent whereby a concentrate having a high vitamin $B_{12}$ activity is formed. If desired the concentrate may be further treated to further purify the vitamin $B_{12}$ potent fraction by known methods such as adsorption on charcoal, fractional extraction and crystallization and the like.

As disclosed in our prior application Serial No. 132,404, the concentrate of this invention can be incorporated into any type of poultry or animal feed which contains substantial amounts of vegetable proteins and carbohydrates in order to replace in whole or in part the animal proteins that have heretofore been considered necessary. For example, such feeds may include singly or in various combinations soybean meal, alfalfa leaf meal, linseed meal, cottonseed meal and various grain meals, such as those derived from wheat, corn, rice oats, buckwheat, barley, etc. Preferably the vegetable base of the feed is fortified with appropriate minerals and other vitamins as is well known in the art.

For a more complete understanding of this invention, reference is now made to a specific example. It will be understood, of course, that this invention is not to be limited to the example given since many changes and modifications may be made without departing from the scope of this invention as defined in the accompanying claims.

*Example*

In accordance with one embodiment of this invention, three parts by weight of a mass of particulate heat-dried commercial Milorganite (80 mesh) were added to ten parts by weight of tap water heated to 70° C. The mixture was stirred and the temperature raised to about 80° C., the hydrogen ion concentration being adjusted from a normally acid condition to a value corresponding to pH 7.0±0.5 by the occasional addition of 1 to 1 aqueous ammonia. After cooling overnight, the mixture was reheated for five hours, filtered with suction and the filtrate evaporated on a steam bath to a heavy syrup. The syrup was then evaporated to dryness in an oven at 70° C. resulting in a brown solid which was easily ground down to a brown powder. This concentrate is useful for the formulation of the feed described in our copending application previously referred to.

In the preparation of a concentrate from Milorganite or dried activated sludge in the manner indicated in the foregoing example, the temperature of the extraction or leaching process may be above or below room temperature. Temperatures of 30° to 40° C. have been found to be satisfactory but higher temperatures up to the boiling point of the solvent or higher usually result in more rapid extraction of the desired water-soluble fraction. It is convenient to operate at hydrogen ion concentrations in the neighborhood of neutrality, however, since the vitamin $B_{12}$ active factor is stable within the range of between about pH 2 and about pH 12, it is permissible to leach and concentrate within this range. It is preferred to employ particles of dried sludge which are larger than those which will pass a 200 mesh screen in order to avoid difficulties in separating the undissolved sludge from the solvent extract by filtration, centrifuging or otherwise. Other processing details also may be varied within wide limits, such as those relating to time of extraction, etc. In commercial operations a percolation process is feasible in which the leaching solvent such as water is passed through one or more successive masses of the sludge whereby a highly active extract is obtainable which may then be concentrated by evaporation or otherwise.

Vitamin $B_{12}$ assays have been made on solid concentrates prepared in the manner indicated in the foregoing specific example in accordance with the procedure disclosed by Peeler et al., Proc. Soc. Expl. Biol. and Med., 72, 515 (1949). These assays showed an activity within the range of about 25 and about 100 micrograms of vitamin $B_{12}$ activity per gram of solid concentrate. Thus the material provides an excellent source material for preparing an even more highly active vitamin $B_{12}$ substance by well known methods. For example, an aqueous solution of a concentrate was subjected to a charcoal adsorption procedure to remove the vitamin $B_{12}$ active factor and the charcoal was leached with ethyl alcohol to extract the factor. The residue upon evaporation of the alcohol has a high potency which may be within the range of 150 to 350 micrograms per gram of solids.

As indicated above, activated sludge is the preferred source of the concentrate prepared in accordance with this invention. However, in its broader aspects, this invention contemplates the use of other types of sludges resulting from the microbiological treatment of sewage. For example, digested activated sludge or sedimented digested sludge may be employed. Digested activated sludge is the product formed by aerobically treating screened raw municipal sewage, passing the thus treated material to a settling tank, allowing the solids to settle, drawing off the supernatant liquid, passing the settled solids to a closed vessel, and digesting the solids under anaerobic conditions. The solid material which remains after the anaerobic digestion is separated and may be dried. Sedimented digested sewage sludge is prepared by passing screened raw municipal sewage to settling tanks and withdrawing the settled solid material to closed tanks wherein it is allowed to undergo an anaerobic digestion. The solid material remaining after the anaerobic digestion is separated and dried.

Water extraction has been specifically disclosed in the foregoing for the preparation of the concentrates, but it is clear that other solvents capable of leaching the water-soluble vitamin $B_{12}$ factor from the sludge, such as isopropyl alcohol, ethyl alcohol, methyl alcohol, water-saturated butyl alcohol, water-diluted acetone, etc., may be employed.

While a dried or heat-dried sludge derived from the microbiological treatment of sewage is the preferred substance from which the concentrate of this invention is prepared, it is also within the scope of this invention to prepare it by the solvent extraction of the raw undried sludge. In such cases it may be preferable to subject the raw undried sludge to an autolyzing step or to enzymatic digestion in order to liberate the vitamin $B_{12}$ active factor, thus making it available for solvent leaching or water extraction in the manner hereinbefore indicated. An important aspect of this invention resides in the treatment of sewage sludge in which the cell walls of the microbial cells constituting the sludge have been disorganized as by drying, heat drying, autolysis, enzymatic digestion, or the like, whereby the vitamin $B_{12}$ is readily extractable as herein disclosed.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process of preparing a product having a high vitamin $B_{12}$ potency which comprises extracting with a solvent for vitamin $B_{12}$ a water-soluble fraction from a solid sludge resulting from the microbiological treatment of sewage comprising a mass of microbial cells having disorganized cell walls whereby to produce a solution having said water-soluble fraction dissolved therein, separating undissolved solid sludge from said solution, and concentrating said fraction in said solution whereby to produce said product.

2. A process of preparing a product having a high vitamin $B_{12}$ potency which comprises treating a dried solid sludge resulting from the microbiological treatment of sewage with water to leach out a water-soluble fraction thereof, separating undissolved solid sludge from the resulting aqueous solution, and concentrating said water-soluble fraction in said solution whereby to produce said product.

3. A process of preparing a product having a high vitamin $B_{12}$ potency which comprises treating a heat-dried sludge resulting from the microbiological treatment of municipal sewage with water to leach out a water-soluble fraction thereof, separating undissolved solid sludge from the resulting solution, and evaporating at least a portion of the water from said solution whereby to produce a concentrate having a high vitamin $B_{12}$ potency.

4. A process of preparing a product having a high vitamin $B_{12}$ potency which comprises leaching a mass of particles of heat-dried activated sludge with water at between about pH 2 and about pH 12 in order to extract a water-soluble fraction, said particles initially being of a size greater than that which will pass through a 200 mesh screen, separating the resulting aqueous solution from undissolved solid sludge, and evaporating at least a portion of the water from said solution whereby to produce a concentrate having a high vitamin $B_{12}$ potency.

5. A process of preparing a concentrate containing an animal growth factor having vitamin $B_{12}$ activity which comprises contacting heat-dried particles of activated sludge with water whereby a water-soluble fraction is extracted from said sludge, separating said water from said dispersion as an aqueous solution containing said water-soluble fraction, and thereafter evaporating water from said solution whereby a concentrate containing said factor is produced.

CARL SHELLEY MINER, JR.
BERNARD WOLNAK.

References Cited in the file of this patent

UNITED STATES PATENTS

| Number | Name | Date |
|---|---|---|
| 1,999,973 | Genter | Apr. 30, 1935 |
| 2,530,416 | Wolf | Nov. 21, 1950 |
| 2,563,794 | Rickes | Aug. 7, 1951 |
| 2,566,123 | De Rose | Aug. 28, 1951 |
| 2,595,159 | Meyer | Apr. 29, 1952 |

OTHER REFERENCES

Lewis, Proceedings of the Society of Experimental Biology and Medicine, November 1949, pages 479 to 480.

Zucker, Vitamins and Hormones, volume VIII (1950), pages 19, 23, 24, 27 and 43.

Hoover, Science, volume 114, August 24, 1951, page 213.

Shorb, Science, volume 107, April 16, 1948, pages 397 to 398.

Rickes, Science, volume 107, April 16, 1948, pages 396 to 397.

Rickes, Science, volume 108, December 3, 1948, pages 634 to 635.